United States Patent [19]

Nakabe et al.

[11] 4,121,244

[45] Oct. 17, 1978

[54] SOLID STATE COLOR IMAGING APPARATUS

[75] Inventors: Ryuhei Nakabe; Yoshio Ohta, both of Hirakata; Toshiro Matsuura, Katano, all of Japan

[73] Assignee: Matsushita Electric Industrial Co., Ltd., Japan

[21] Appl. No.: 736,186

[22] Filed: Oct. 27, 1976

[30] Foreign Application Priority Data

Oct. 24, 1975 [JP]   Japan ................................. 50-128752

[51] Int. Cl.$^2$ ............................................. H04N 9/07
[52] U.S. Cl. ...................................................... 358/44
[58] Field of Search .......................... 358/41, 43, 44, 48

[56] References Cited

U.S. PATENT DOCUMENTS

| | | | |
|---|---|---|---|
| 3,919,713 | 11/1975 | Nakamura | 358/44 X |
| 3,971,065 | 7/1976 | Bayer | 358/41 |
| 3,975,760 | 8/1976 | Yamanaka et al. | 358/41 |
| 4,016,598 | 4/1977 | Yamanaka | 358/41 |

FOREIGN PATENT DOCUMENTS 2,285,773   4/1976   France ........................................ 358/41

OTHER PUBLICATIONS

B-502,289, Colen Coding Filter for Charge-Coupled Service Camer, Chaii., Jan. 13, 1976.

*Primary Examiner*—John C. Martin
*Assistant Examiner*—Aristotelis M. Psitos
*Attorney, Agent, or Firm*—Wenderoth, Lind & Ponack

[57] ABSTRACT

A solid state color imaging apparatus with a color encoding filter and a solid state area imaging device for producing a color signal representing an optical image of an object. The color filter is formed from a plurality of pairs of color filter strips arranged one above the other in a vertical scanning direction, each of which color filter strips consists of alternating transmissivity filter elements of two different colors. The color filter is placed on the imaging device so that each photosensitive element of the imaging device is covered with a corresponding filter element. During the self-scanning of the area imaging device, first and second signals which represent color difference signals are derived therefrom alternately in the successive scan lines, from which the color signal is produced.

26 Claims, 11 Drawing Figures

SOLID STATE COLOR IMAGING APPARATUS

BACKGROUND OF THE INVENTION

This invention relates to a solid state color imaging apparatus utilizing a charge transfer device such as a CCD (Charge Coupled Device) and a BBD (Bucket Brigade Device) or a photodiode array and, more particularly, to such apparatus which senses and stores charges in proportion to incident light and provides a sequential color signal.

As is well known, it is preferable to use a solid state area imaging device for a television camera in place of a pick up tube for converting an optical image of an object to an electrical signal because of its long life, stability, lower power consumption, etc. Some such devices have been sold in the market.

A solid state color imaging apparatus for producing a color signal can be constructed with dichromic mirrors and three solid state imaging devices which produce three independent color component signals. However, unlike a television camera utilizing three pick up tubes, such an imaging apparatus requires much more accuracy in locating each imaging device because of the self scanning mechanism of the device. As a matter of fact three color signals from these pick up means should exactly coincide with each other to produce the color signals. Adjusting these scanning areas is easily accomplished in the tube type color camera, because the scanning area of each pick up tube is controlled properly by applying a DC current to the deflection coil of the pick-up tube. On the other hand, in a solid state imaging apparatus, the scanning area is not controlled but is determined only by the location and the size of the photosensitive area of the device. A color imaging apparatus utilizing a single imaging device does not require such accurate location of a plurality of devices.

Such a color imaging apparatus with a single solid state imaging device can be constructed by any kind of solid state area imaging device by additionally providing a striped color filter which consists of a plurality of sets of three different color transmissivity filter strips and a color signal recovering circuitry. The color filter is placed on the photosensitive area of the imaging device so that the side by side direction of the filter strips is identical with that of the horizontal scan and each filter strip covers one photosensitive element in the direction of the horizontal scan. In this apparatus, a dot sequential color representing signal is derived from the imaging device with successive horizontal scanning. Then, red, blue and green component signals are obtained from the dot sequential signal through a sampling circuit which operates in synchronism with the high speed horizontal clock and separates these color component signals from each other. The color component signals are processed to produce the color signal. The color signal can be produced by a synchronous detection method as well, namely, color difference signals are obtained through a synchronous detection circuit from the dot sequential color signal with a reference signal produced from the horizontal clock pulse of the imaging device.

In these color imaging apparatuses, however, it is necessary to provide three times the number of photosensitive elements as in a black and white imaging apparatus in order to obtain the same resolution. Therefore the size of the image pick up device also becomes three times as large as a black and white imaging apparatus. Moreover, as is well-known, many difficulties are involved in manufacturing such a large area imaging device.

SUMMARY OF THE INVENTION

An object of the present invention, therefore, is to provide a solid state color imaging apparatus having a single solid state imaging device for producing a color signal, yet which requires less area for sensing an image.

Another object of the present invention is to provide a practical solid state color imaging apparatus which is capable of producing color difference signals and a continuous luminance signal.

In accordance with the present invention a photosensitive area of a solid state imaging device includes a plurality of pairs of photosensitive element lines arranged side by side in a vertical scanning direction, each of which photosensitive element lines consists of two photosensitive elements in an alternating sequence which sense and store charges representing different color components, respectively. Such an imaging device is, for example, composed of a black-and-white solid state imaging device and a striped color filter which is formed of a plurality of pairs of color filter strips arranged one above the other in alternating sequence in the vertical scanning direction, each of which color filter strips consists of two different color transmissivity filter elements positioned side by side in an alternating sequence.

During a continuous self-scanning of the device an output signal which includes two color difference components occuring alternately in the successive horizontal scans and a luminance component is derived therefrom. Sequential color difference signals are produced from such color difference components, for instance, through a synchronous detecting circuit with a reference signal derived from the horizontal clock signal. If it is necessary to produce simultaneous color difference signals, the apparatus should further comprise a delay line which delays the line sequential color difference signals by one horizontal period and a switching circuit which transmits each color difference signal to a predetermined processing circuit to produce such simultaneous signals.

A 2:1 interlace is accomplished by providing two lines of photosensitive elements corresponding to each color filter strip and reading out charge signals from the photosensitive elements in different lines in the alternate fields.

BRIEF DESCRIPTION OF THE DRAWINGS

The invention will now be described in greater detail in connection with the accompanying drawings, in which.

DETAILED DESCRIPTION OF THE PREFERRED EMBODIMENTS

Figure 1A:
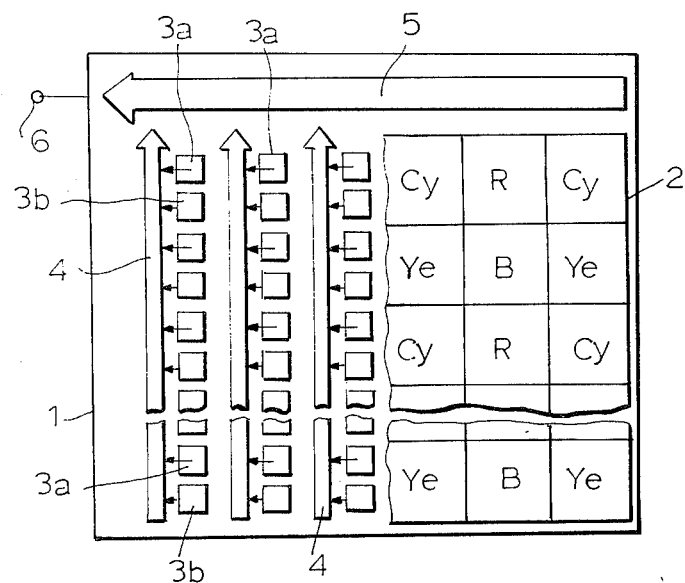
FIG. 1A is a diagram showing a color imaging device employed in an embodiment of a solid state color imaging apparatus according to the invention.
Figure 1B:
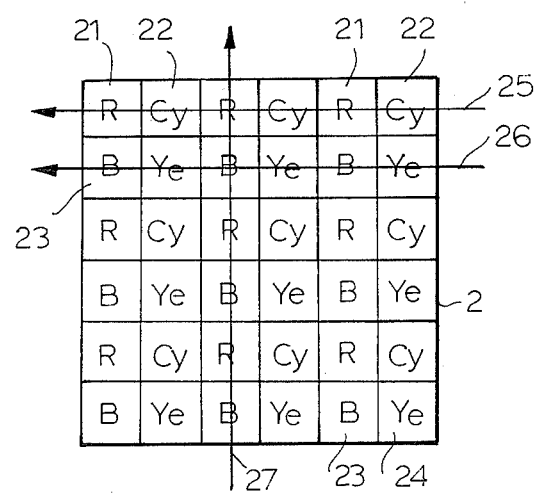
FIG. 1B is a diagram showing a striped color filter utilized in the device of FIG. 1A.

FIG. 1A shows an embodiment of a solid state color imaging device according to this invention, which is composed essentially of a charge transfer area imaging device 1 employing the inter line transfer method and a striped color filter 2, such as shown in FIG. 1B. The concept of the inter line transfer area imaging device is described, for example, in 1974 IEEE Intercon Technical Papers, Session 2 — 2. In FIG. 1A, the device consists of a plurality of photodiodes 3a and 3b, vertical transfer CCD registers 4 and an output CCD register 5, which CCDs 4 and 5 are operated by a two-phase clock. In FIG. 1B, color filter elements 21 pass red component light R, and elements 22, 23 and 24 pass cyan component light Cy, blue component light B and yellow component light Ye, respectively. The filter elements 21 and 22 are positioned side by side and in alternating sequence in a horizontal scanning direction 25 to form a first color filter strip, that is a (R - Cy) filter strip, and the elements 23 and 24 are positioned side by side and in alternating sequence in the horizontal scanning direction 26 to form a second color filter strip, that is a (B - Ye) filter strip. The striped color filter 2 is formed from these color filter strips positioned one above the other in an alternating sequence in the vertical scanning direction 27, as shown in FIG. 1B, with the elements 21 aligned with elements 23 in the vertical direction. This color filter 2 is placed between an object and the imaging device 1 so that each filter element covers one photodiode 3a or 3b in the horizontal scanning direction 25 or 26, and each color filter strip covers two photodiodes 3a and 3b in the vertical scanning direction 27 in order to read out different charge signals which are displaced a half bit in alternate fields.

The light from the object is focused by an imaging lens onto the imaging device 1 through the color filter 2. The charge signals which are stored during one frame interval in the photodiodes are in proportion to the intensity of the color components which impinge upon corresponding photodiodes 3a and 3b through the color filter elements 21, 22, 23 and 24. Then the stored charge signals are read out into corresponding positions of the vertical transfer CCDs 4 once in the frame interval during the vertical blanking period of the imaging apparatus under the control of a gate pulse $\phi_G$. In the first field, the charge signals are read out from photodiodes 3a into the CCDs 4. They are transferred one line at a time in the vertical scanning direction 27 during the horizontal blanking interval with a two-phase vertical transfer clock signal $\phi_v$, then read-into the corresponding positions of the output CCD register 5. The charge signals are then read out through an output terminal 6 from the CCD 5 with a two-phase horizontal transfer clock $\phi_H$ during the horizontal scanning interval. When all of the charge signals read out from the photodiodes 3a in the first field are transferred out of the device 1, the charge signals stored in the photodiodes 3b are read out at the beginning of the second field into the corresponding positions of the vertical transfer CCDs 4. These signals are then transferred out in the same manner as for the first field.

Figure 2A:
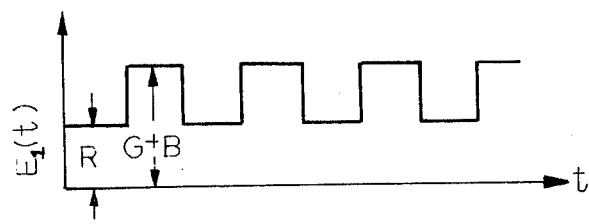
FIG. 2A and FIG. 2B are diagrams showing the wave forms of output signals of the color imaging device of FIG. 1A.
Figure 2B:
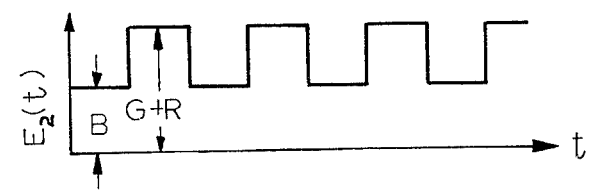

When white light is applied uniformly upon the solid state color imaging device shown in FIG. 1A, the output signal therefrom is as shown in FIG. 2A and FIG. 2B, where $E_1(t)$ designates the wave form of the output signal which represents a line of signals encoded by the first filter strip, that is the (R-Cy) filter strip, and $E_2(t)$ designates the wave form which represents the succeeding line of signals encoded by the second filter strip, that is the (B-Ye) filter strip. $E_1(t)$ and $E_2(t)$ are derived alternately driving the sequential horizontal line scans and both include a luminance component and a modulated component the modulation frequency of which is the repetition frequency of the filter elements, i.e. the frequency with which the signals corresponding to filter elements of the same kind repeat during the scanning of a line. Since the color components are included in alternate bits in the output signal, the modulation frequency of $E_1(t)$ and $E_2(t)$ is equivalent to one half of the horizontal transfer clock frequency.

If the repetition angular frequency of the filter elements 21, 22, 23 and 24 is $\omega$, the output signals $E_1(t)$ and $E_2(t)$ obtained by the continuous horizontal line scans can be expressed in the form of a Fourier series, respectively, as follows:

$$E_1(t) = \frac{\overline{W}}{2} + (R - B - G) \sum_{n=1}^{\infty} \left| \frac{\sin(n\pi/2)}{n\pi/2} \right| \cdot \cos n\omega t$$

$$E_2(t) = \frac{\overline{W}}{2} + (B - G - R) \sum_{n=1}^{\infty} \left| \frac{\sin(n\pi/2)}{n\pi/2} \right| \cdot \cos n\omega t$$

where $W = R + B + G$.

Figure 3:
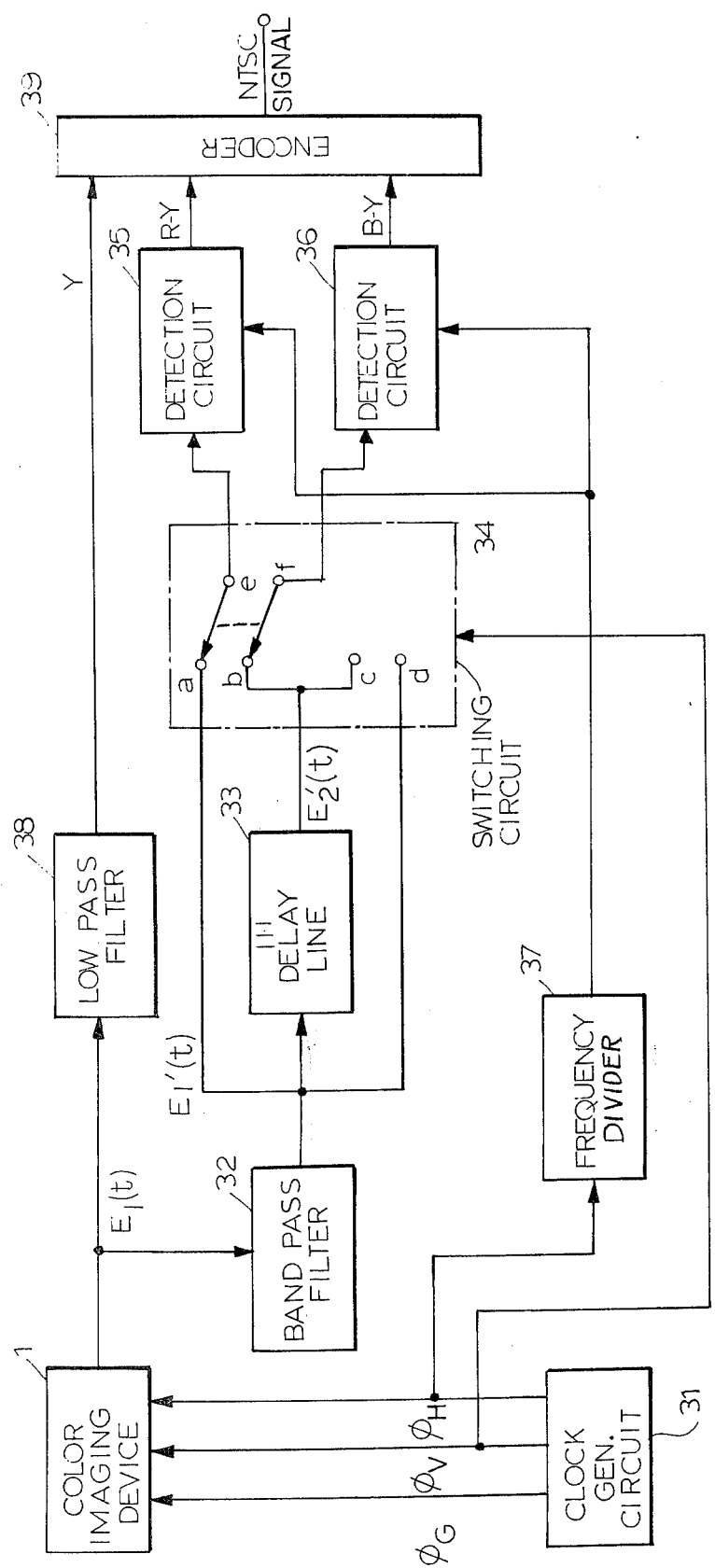
FIG. 3 is a block diagram showing an embodiment of the solid state color imaging apparatus according to the invention.

FIG. 3 illustrates an embodiment of a solid state color imaging apparatus according to the invention, which utilizes synchronous detection circuits for producing the color signal.

The solid state color imaging device 1 is driven by the gate pulse $\phi_G$, the two-phase vertical transfer clock signal $\phi_V$ and the two-phase horizontal transfer clock signal $\phi_H$, which are generated in a clock signal generating circuit 31. The output signals $E_1(t)$ and $E_2(t)$ from the device 1 are applied to a band-pass filter 32. Since the luminance component and the harmonic frequency components of the modulated component of the signal are filtered out by the filter 32, the fundamental frequency components $E_1(t)$ and $E_2(t)$ are obtained therethrough in the alternate horizontal scan lines. Hence $E_1(t)$ and $E_2(t)$ are as follows:

$$E'_1(t) = \{R - (B + G)\} \cdot \cos wt$$

$$E'_2(t) = \{B - (G + R)\} \cdot \cos wt$$

These line sequential color component signals are applied to a delay line 33 the delay time of which is one horizontal period, that is about 64$\mu$ sec. The delayed signal from the delay line 33 is applied to input terminals b and c of a switching circuit 34 and the undelayed signal from the band-pass filter 32 is applied to input terminals a and d of the switching circuit 34, as well. Since the output from the imaging device 1 includes $E_1(t)$ and $E_2(t)$ alternately in the succeeding horizontal periods, simultaneous color difference component signals $E_1(t)$ and $E_2(t)$ appear at respective pairs of input terminals of the switching circuit 34. Namely, when $E_1(t)$ is derived from the band-pass filter 32 for a certain horizontal scan, it is applied to the terminals a and d, and delayed $E_2(t)$ which has been read out during the preceding horizontal scan is applied to the terminals b and c.

The switching circuit 34 switches the transmission mode in the alternate horizontal periods is synchronism with the vertical transfer clock signal $\phi_v$, so that $E_1(t)$ and $E_2(t)$ are always transmitted simultaneously to output terminals e and f, respectively. For that purpose, the output terminals e and f of the switching circuit 34 are connected to the input terminals a and b when the charge signals encoded by the (R-Cy) filter strip are being transferred out of the imaging device 1, and they are connected to output terminals c and d during the time the signals encoded by the (B-Ye) filter strip are being transferred out of the imaging device 1. Continuous signals $E_2(t)$ and $E_2(t)$ from the switching circuit 34 are demodulated by synchronous detection circuits 35 and 36 with a reference signal to produce simultaneous color difference signals R-Y and B-Y, respectively. The reference signal is derived from the horizontal transfer clock pulse through a frequency divider which is contituted by a conventional flip-flop circuit which divides the frequency of the clock pulse one half thereof.

While a luminance signal Y, which is defined as $Y = R + B + G$, is derived from the output signal of the imaging device through a low-pass filter 38 which filters out the modulated component included in the output signal. The luminance signal and the color difference signals are then applied to an encoder 39, where a subcarrier is modulated with the color difference signals and then combined with the luminance signal to produce the simultaneous color video signal, such as the NTSC color signal.

Figure 4:
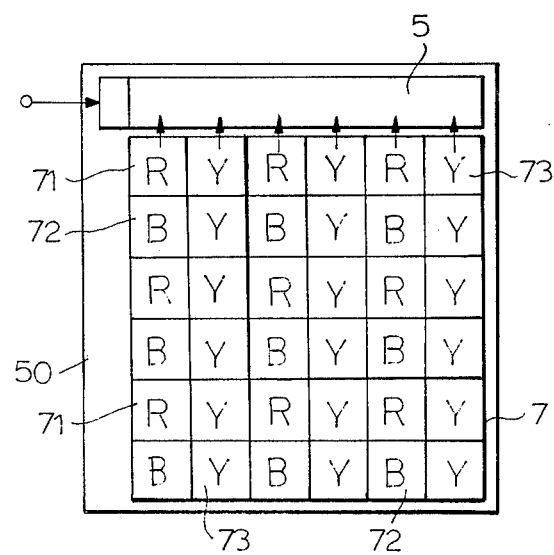
FIG. 4 is a diagram showing another form of a solid state color imaging device.

It is also possible to use a striped color filter 7, such as shown in FIG. 4, instead of the filter 2, wherein the color filter elements 71 and 72 have the same color transmissivity characteristics as elements 21 and 22 in FIG. 1B, respectively, and element 73 has the characteristic passes all color components or a component corresponding to the luminance signal of the standard color video signal. The elements 73 are arranged in line in the vertical scanning direction, and arranged alternately with elements 71 and 82 in the horizontal scanning direction to form a (R-Y) filter strip and (B-Y) filter strip, respectively. The transmissivity of the element 73 can be controlled, for example, with a neutral density filter, so that the amplitude of the luminance component signal is substantially equal to that of the red component signal or the blue component signal when a white object is sensed by the imaging device.

In this color imaging device 50 the charges which are stored in the successive photodiodes covered by the (R-Y) filter strip represent alternat the red component of the image and the luminance component thereof, while the charges in the successive photodiodes covered by the (B-Y) filter strip represent alternately the blue component and the luminance component. Therefore, in the continuous horizontal line scans, the color difference signals which are modulated with the repetition frequency of the color filter elements 71 and 72 are produced alternately in the sequential horizontal line scans, and the luminance signal as well for every two horizontal transfer clock signals of each horizontal scan.

It will be understood that the modulated color difference signals may be demodulated by the synchronous detection circuits to produce the color difference signals R-Y and B-Y in the same manner as in the embodiment in FIG. 3. However, the luminance signal is derived through a sampling circuit which extracts the luminance signal component from the output signal of the imaging device 50.

Figure 5:
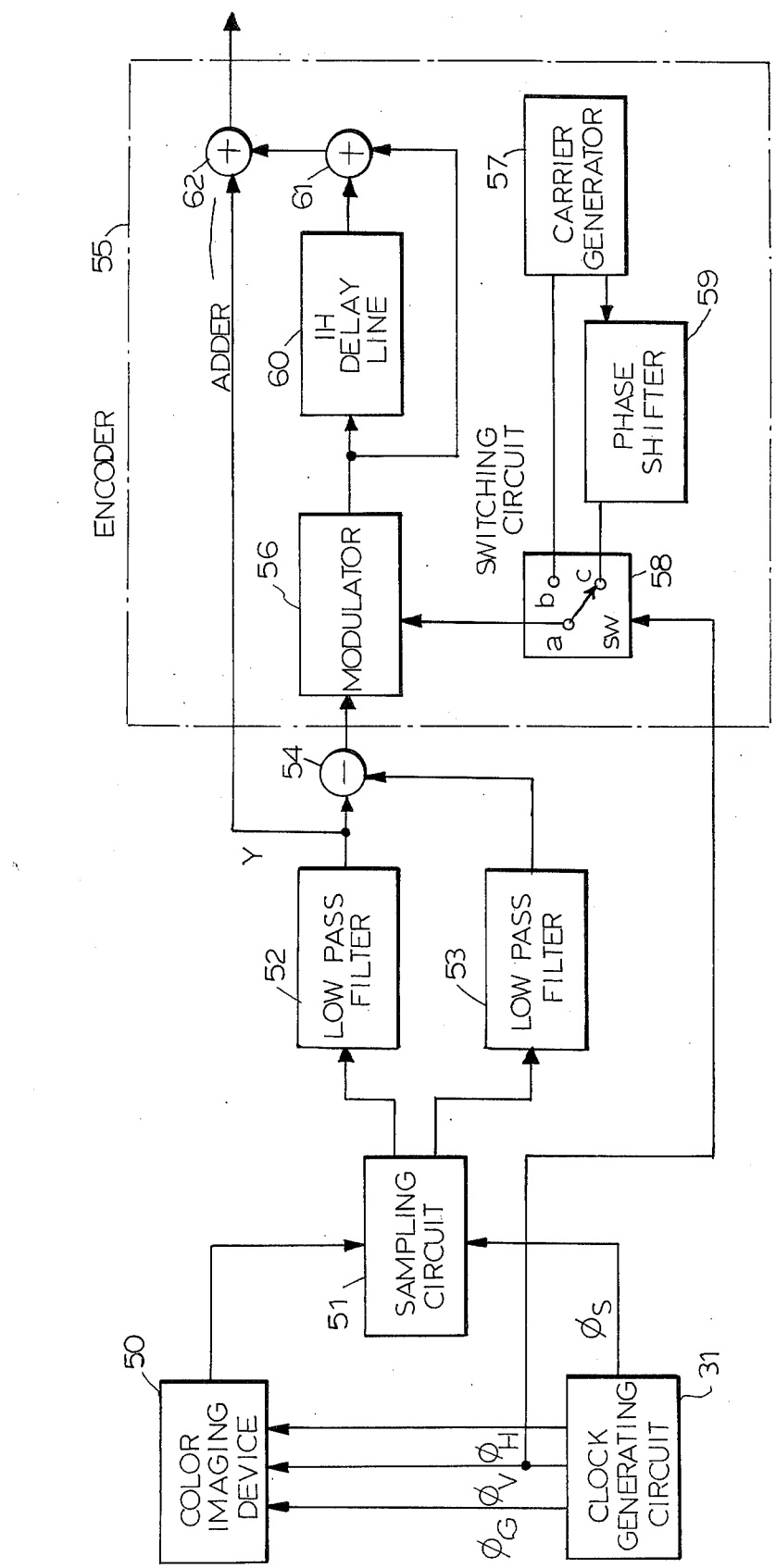
FIG. 5 is a block diagram showing another embodiment of the imaging apparatus according to the invention using the color imaging device in FIG. 4.

In the embodiment in FIG. 3, the line sequential color difference signals are converted into simultaneous color difference signals by the delay line 33 and the switching circuit 34 before the color difference signals are applied to the encoder 39. However, such conversion may be done in an encoder described in connection with the embodiment shown in FIG. 5. In such an apparatus, the modulated signal component which is derived from the band-pass filter 32 is applied to one synchronous detection circuit which produces R-Y and B-Y color difference signal in the alternate horizontal scans with the reference signal from the frequency divider 37. The line sequential color difference signals R-Y and B-Y are applied to an encoder which is similar to that of FIG. 5. In the encoder, a first subcarrier can be modulated with the R-Y color difference signal in a horizontal period and a second subcarrier which has a 90° — phase difference with respect to the first subcarrier can be modulated with the B-Y color difference signal in the succeeding horizontal period in a modulator. Then the modulated color difference signals from the modulator are delayed by one horizontal period through a delay line then added to the undelayed modulated color difference signals from the modulator to produce simultaneous modulated color difference signals. These color difference signals are combined with the luminance signal derived from the output signal of the imaging device 50 through the above said sampling circuit and the low-pass filter. The structure and operation of such an encoder will now be described in connection with FIG. 5. FIG. 5 includes a sampling circuit for producing the color difference signals as well as the luminance signal. In FIG. 5, the luminance signal component and the color signal component, that is the red or blue component, are transferred out of the color imaging device alternately by the horizontal transfer clock signal. These components are extracted, respectively, from the output signal of the device 50 in the sampling circuit 51 by means of a sampling pulse signal $\phi_s$ which is generated in the clock generating circuit 31 and is in synchronism with each signal component of the output. The repetition frequency of the sampling pulse signals should be one half of the horizontal transfer clock signal $\phi_H$. The luminance component and the color components are applied to low-pass filters 52 and 53, respectively, to produce the luminance signal Y and the line sequential color component signals R and B. The line sequential color difference signals are produced in a subtractor 54 which subtracts the luminance signal from the line sequential color component signals, then applied to an encoder 55 with the luminance signal from the low-pass filter 52.

In the encoder 55 a subcarrier generated in a carrier signal generator 57 is modulated in a modulator 56 by the color difference signals from the subtractor 54. A switching circuit 58 operates in synchronism with the vertical transfer clock signal so that its output terminal a is connected to the input terminal b when the color difference signal B-Y is derived from the (B-Y) filter strip, and to the input terminal c when the color difference signal R-Y is derived from under the (R-Y) filter strip in a succeeding horizontal scan. When the color difference signal B-Y is produced through the subtractor 54, the switching circuit 58 is switched by the control pulse which is the vertical transfer clock signal or a pulse which is synchronous with such signal. Therefore, the subcarrier from the carrier generator 57 is applied to te modulator 56 so as to be modulated with the color difference signal B-Y. In the succeeding horizontal period, the mode of the switching circuit 58 having been changed during the horizontal blanking period by the control pulse, the subcarrier the phase of which is shifted 90° by a phase shifter 59 is applied to the modulator 56 and modulated there by the color difference signal R-Y.

The modulated color difference signals in the line sequential mode are delayed by one horizontal period through a delay line 60 and added in an adder 61 with the undelayed modulated color difference signals to produce two simultaneous color difference signals which have 90°-phase difference therebetween. These modulated color difference signals are then combined with the luminance signal in an adder 62.

In the embodiments of FIGS. 3 and 5, if the line sequential color difference signals are required for reproducing the color image in the reproducing system, such as a SECAM system, delay lines 33 and 60 and switching circuits 34 and 58 are not used.

Figures 6A, 6B, 7:
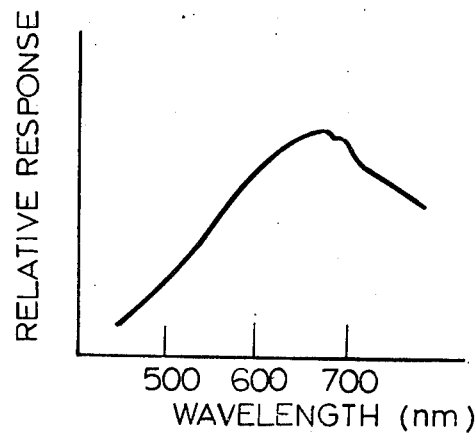
FIG. 6A and FIG. 6B are diagrams showing other forms of striped color filters which are able to be used in a solid state color imaging apparatus of the invention.
FIG. 7 is a diagram showing the spectral sensitivity characteristics of a solid state imaging device.

It is advantageous to use a color filter such as is shown in FIG. 6A in place of the color filter 7 in the color imaging apparatus in FIG. 5. As is obvious from the spectral sensitivity characteristics, such as shown in FIG. 7, of the solid state imaging device which consists mainly of silicon, the relative sensitivity of the blue component light is about one third that of the green component light. Therefore, if the filter elements 72 of the color filter 7 of FIG. 4 are replaced with the elements 74 which passes the green component light, as is shown in FIG. 6A, the signal-to-noise ratio of the color signal is improved. In this case, the color difference signal B-Y is obtained by processing the green component signal, the red component signal and the luminances signal which are produced in the same manner as the apparatus of FIG. 5.

Figure 8:
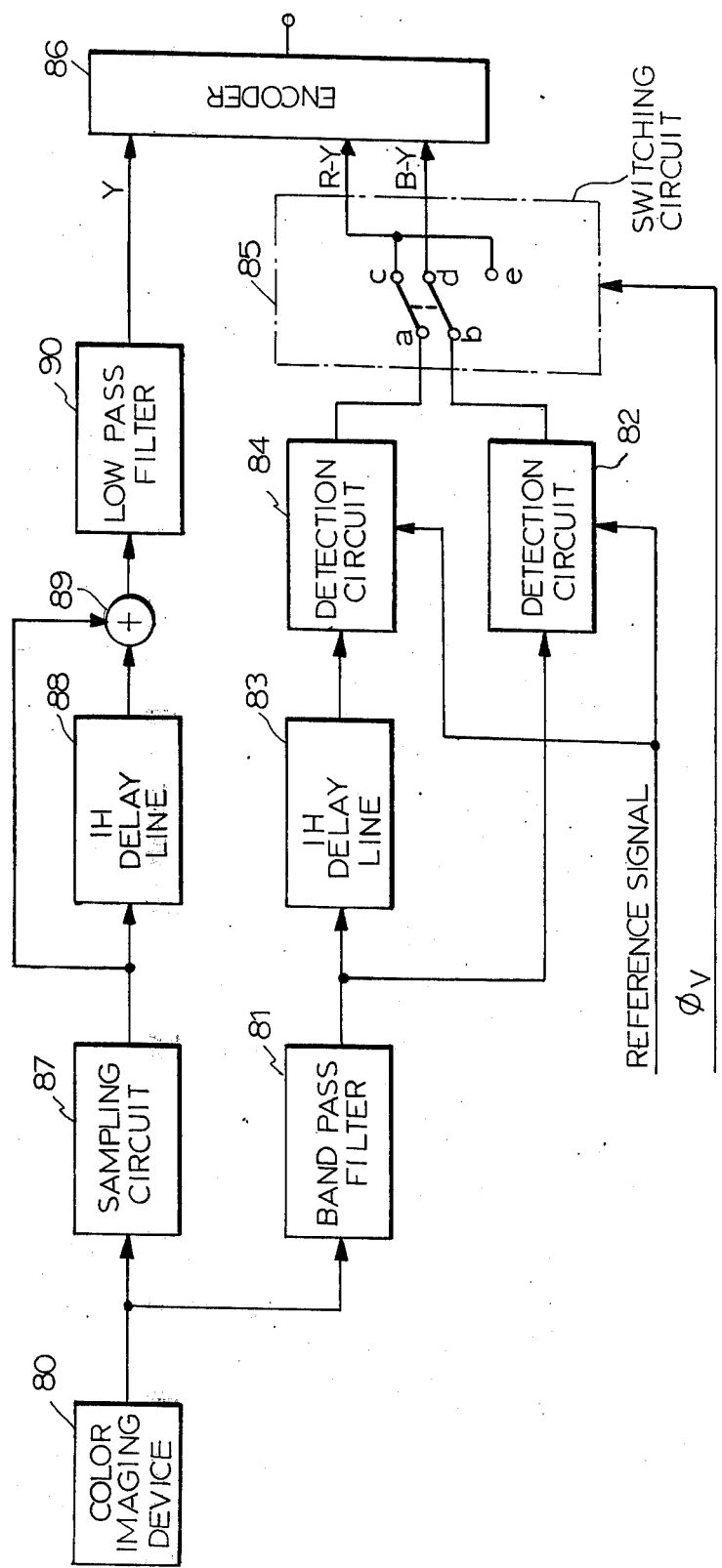
FIG. 8 is a block diagram showing the principal part of a further embodiment of a solid state color imaging apparatus according to the invention.

FIG. 8 shows a further embodiment of the color imaging apparatus according to the invention, which uses a color filter 8 such as shown in FIG. 6B. The color filter 8 is formed of a plurality of pairs of an (R-Y) filter strip consisting of red transmissivity elements 71 and luminance transmissivity elements 73 positioned side by side in alternating sequence, and a (Y-B) filter strip consisting of luminance transmissivity elements 73 and blue transmissivity elements 72 side by side in alternating sequence. The filter strips are arranged in the horizontal scanning direction, and in the vertical scanning direction the red and the luminance transmissivity elements 71 and 73 are aligned and the blue and the luminance transmissivity elements 72 and 73 are aligned.

In FIG. 8 the color imaging device 80 operates in the same way as the imaging device 50 in FIG. 5. The modulated signal component is derived from the output signal of the color imaging device 80 through a bandpass filter 81. The modulation frequency of the signal component is the repetition frequency of the color filter element. Then it is applied directly to a detection circuit 82 and also applied to a detection circuit 84 through a delay line the delay time of which is one horizontal period. These detection circuits 82 and 84 demodulate two color difference signals alternately during the sequential horizontal scans with a reference signal which is generated in a frequency divider (not shown), such as shown in FIG. 3, to produce the simultaneous color difference signals. A switching circuit 85 operates so that the color difference signals R-Y and B-Y are transmitted to the corresponding process circuits in an encoder 86. For that purpose, the input terminals $a$ and $b$ are connected to the output terminals $c$ and $d$, respectively, during one horizontal scan, and to terminals $d$ and $e$ in the succeeding horizontal scan, under the control of the vertical transfer clock signal $\phi_v$ or a pulse generated during the horizontal blanking period.

The luminance component is extracted from the output signal of the color imaging device 80 in a sampling circuit 87 with a sampling pulse signal which is shifted one bit in the subsequent horizontal scans. The extracted luminance component signal is delayed by one horizontal period in a delay line 88 then added in an adder 89 too the undelayed luminance component signal. The combined signal from the adder 89 is applied to a low-pass filter 90 to produce the luminance signal Y. Signals Y, R-Y and B-Y are applied to the encoder 86 and processed there to produce the color video signal. Since each preceding dot of the luminance component signal is inserted between dots of the subsequent luminance component signal the horizontal resolution is improved with respect to the apparatus in FIG. 5.

Although an inter line CCD area imaging device is used in the disclosed embodiments, it is not essential for the invention. It is possible to use other imaging devices, namely a frame transfer CCD imaging device or photodiode array with scanning shift registers, for the imaging device.

When the frame transfer CCD area imaging device, the striped color filter such as shown, for example, in FIG. 4 can be placed upon the imaging area of the device so that each diode of the CCD is covered with a color filter element. The operation of the imaging device is described, for example, in the United States Pat. No. 3,801,884. The 2:1 interlace may be accomplished by reading out charge signals from under different transfer electrodes which are displaced substantially half of their vertical dimension in the direction of the vertical scan in the succeeding fields.

When the photodiode array, the striped color filter is placed upon the array so that each filter element covers one photodiode in the direction of the horizontal scan and one or two photodiodes in the direction of the vertical scan. To accomplish the 2:1 real interlace, a pair of photodiodes should be provided corresponding to each filter element and the charge signals should be read out from different ones of each such pair in the succeeding fields. However, it is possible to read out the charge signals from the same photodiodes which are provided in one to one correspondence with each filter element in the succeeding fields.

The color imaging apparatus according to the invention is applicable to a solid state color camera employing two imaging devices, one of which is for producing the luminance signal and the other of which is for producing the color signal. In such camera, the color signal produced by the apparatus of the invention is combined with the luminance signal produced by the other device to produce the color video signal.

Although this invention has been particularly shown and described, it is contemplated that various changes and modifications may be made without departing in any way from the scope of this invention as set forth in the following claims.

The embodiments of the invention in which an exclusive property or privilege is claimed are defined as follows:

1. A solid state color imagining apparatus for producing a color signal representing a color image of an object, said apparatus comprising:

photosensitive means including a plurality of pairs of lines of photosensitive elements with the lines in each pair being different from each other and the pairs of lines being positioned one above the other with the different kinds of lines in alternating sequence in the direction of a vertical scan of said photosensitive means, each of said photosensitive element lines having light sensitivity elements of two kinds in alternating sequence in the direction of a horizontal scan of said photosensitive means;

clock signal generating means for generating a clock signal;

signal reading means coupled to said photosensitive means and said clock signal generating means for operating said photosensitive means for reading out in synchronism with said clock signal charge signals from said photosensitive means for producing a first signal and a second signal alternately in successive horizontal scans; said first signal including portions representative of a first light component and of a second light component in alternating sequence and said second signal including portions representative of a third light component and of a fourth light component in alternating sequence; and circuit means coupled to said photosensitive means for receiving the first and second signals and deriving a modulated component therefrom which represents the color difference of the image and modulated with the repetition frequency of said photosensitive elements; and demodulating circuit means coupled to said filter circuit means and said clock signal generating means for receiving the modulated component and demodulating the color difference signals in synchronism with said clock signal.

2. A solid state color imaging apparatus as claimed in claim 1 wherein said photosensitive means comprise:

color filter means and a photosensitive area on which said color filter means is placed for storing a charge signal in proportion to the intensity of light impinging thereon through said filter means;

said color filter means being of two kinds and being in filter strips one above the other in alternating sequence in the direction of the vertical scan, each of said filter strips consisting of a plurality of color transmissivity filter element of at least two different kinds positioned in alternating sequence in the direction of the horizontal scan.

3. A solid state color imaging apparatus as claimed in claim 1 wherein said pairs of lines of photosensitive elements consists of a first line including first color sensitivity elements and second color sensitivity elements in alternating sequence in the direction of the horizontal scan and a second line including third color sensitivity elements and fourth color sensitivity elements side by side in alternating sequence in the direction of the horizontal scan.

4. A solid state color imaging apparatus for producing a color signal representing a color image of an object, said apparatus comprising:

photosensitive means including a plurality of pairs of lines of photosensitive elements with the pairs of lines being positioned one above the other with the different kinds of lines in alternating sequence in the direction of a vertical scan of said photosensitive means, each of said photosensitive element lines having light sensitivity elements of two kinds in alternating sequence in the direction of a horizontal scan of said photosensitive means;

horizontal clock signal generating means for generating a horizontal clock signal;

signal reading means coupled to said photosensitive means and said horizontal clock signal generating means for applying said horizontal clock signal to said photosensitive means for reading out in synchronism with said horizontal clock signal generating means charge signals from said photosensitive means for producing a first signal and a second signal alternately in successive horizontal scans; said first signal including portions representative of a first light component and of a second light component in alternating sequence and said second signal including portions representative of a third light component and of a fourth light component in alternating sequence;

extracting circuit means coupled to said photosensitive means for receiving the first and second signals and extracting a modulated component therefrom which represents the color difference of the image and modulated with the repetition frequency of said photosensitive elements;

reference signal generating means coupled to said horizontal clock signal generating means for generating a reference signal in synchronism with said horizontal clock signal, having a frequency which is one half that of said horizontal clock signal; and demodulating circuit means coupled to said extracting circuit means and said reference signal generating means for receiving the modulated component and demodulating the color difference signals with said reference signal.

5. A solid state color imaging apparatus as claimed in claim 4 wherein one of said kinds of light sensitivity elements is a luminance sensitivity element and the other of said kinds of light sensitivity elements is a color sensitivity element, the color sensitivity elements in alternate lines being different; and said extracting circuit means and said demodulating circuit means together comprise sampling circuit means which separates a luminance signal component and color signal components from each other under the control of said reference signal; and further comprising combining circuit means coupled to said sampling circuit means for receiving the luminance signal component and the color signal components for combining these signals for producing a color difference signals representing the color difference.

6. A solid state color imaging apparatus as claimed in claim 4 wherein said demodulating circuit means is a synchronous detection circuit means for demodulating line sequential color difference signals.

7. A solid state color imaging apparatus for producing a color signal representing a color image of an object, said apparatus comprising:

color filter means constituted by a plurality of pairs of filter strips positioned one above the other in the direction of a vertical scan, one of which filter strips consists of a plurality of first light transmissivity filter elements and second light transmissivity filter elements in alternating sequence in the direction of the horizontal scan, the other of said filter strips consists of alternate filter elements including at least third light transmissivity filter elements and fourth light transmissivity filter elements in alternating sequence in the direction of the horizontal scan;

photosensitive means including a plurality of photosensitive elements for converting a light impinging thereon into an electrical signal, said color filter means being placed on said photosensitive means with each photosensitive element of said photosensitive means covered by at least one of said filter element;

horizontal clock signal generating, means for generating a horizontal clock signal;

signal reading means coupled to said photosensitive means and said horizontal clock signal generating means for operating said photosensitive means for reading out the electric signals from said photosensitive elements with said horizontal clock signal for producing first and second signals alternately in successive horizontal scans, said first signal including portions representative of a first light component and a second light component in alternating sequence and said second signal including portions representative of at least a third light component and a fourth light component in alternating sequence;

circuit means coupled to said photosensitive means for deriving a modulated component therefrom which is modulated with a repetition frequency of the filter elements and represents color differences of the image; and demodulating circuit means coupled to said circuit means and said horizontal clock generating means for receiving the modulated component for demodulating the color difference signals with a signal which is in synchronism with said horizontal clock signal.

8. A solid state color imaging apparatus as claimed in claim 7 wherein the first and second light transmissivity filter elements are red transmissivity filter elements and cyan transmissivity filter elements, respectively, and said third and fourth light transmissivity filter elements are blue transmissivity filter elements and yellow transmissivity filter elements, respectively.

9. A solid state color imaging apparatus as claimed in claim 8 in which said red transmissivity filter elements are positioned above said blue transmissivity filter elements, and said cyan transmissivity filter elements are positioned above said yellow transmissivity filter elements.

10. A solid state color imaging apparatus as claimed in claim 7 wherein said demodulating circuit means is constituted by synchronous detection circuit means for receiving the modulated component from said circuit means for demodulating the color difference signals with said signal which is in synchronism with said horizontal clock signal and the frequency of which is one half that of said horizontal clock signal.

11. A solid state color imaging apparatus as claimed in claim 7 wherein said demodulating circuit means includes:

delay circuit means coupled to said filter circuit means for delaying the modulated component therefrom by one horizontal scan period;

first and second output terminals; and switching circuit means coupled to said filter circuit means, said delay circuit means, said horizontal clock signal generating means and said first and second output terminals for receiving the modulated component and delayed modulated component therefrom for transferring these components to said output terminals for always supplying said first output terminal with said first signal and said second output terminal with said second signal, in synchronism with said horizontal clock signal.

12. A solid state color imaging apparatus as claimed in claim 7 wherein said demodulating circuit means includes:

delay circuit means for receiving a modulated component of the first and second signals from said photosensitive means, which component is modulated with a frequency corresponding to the repetition frequency of the filter elements, for delaying the modulated component by one horizontal period; and circuit means coupled to said delay circuit means adapted for receiving the modulated component and a delayed modulated component from said delay circuit means for producing simultaneous color difference signals.

13. A solid state color imaging apparatus for producing a color signal representing a color image of an object, said apparatus comprising:

color filter means constituted by a plurality of pairs of filter strips positioned one above the other in the direction of a vertical scan, one of which filter strips consists of a plurality of first light transmissivity filter elements and second light transmissivity filter elements in alternating sequence in the direction of the horizontal scan, the other of said filter strips consists of alternate filter elements including at least third light transmissivity filter elements and fourth light transmissivity filter elements in alternating sequence in the direction of the horizontal scan;

photosensitive means including a plurality of photosensitive elements for converting light impinging thereon into an electric signal, said color filter means being placed on said photosensitive means with each photosensitive element of said photosensitive means covered by at least one of said filter elements;

horizontal clock signal generating means for generating a horizontal clock signal;

signal reading means coupled to said photosensitive means and said horizontal clock signal generating means for operating said photosensitive means for reading out the electric signals from said photosensitive elements with said horizontal clock signal for producing first and second signals alternately in successive horizontal scans, said first signal including portions representative of a first light component and a second light component in alternating sequence and said second signal including portions representative of at least a third light component and a fourth light component in alternating sequence;

signal processing means coupled to said photosensitive means and responsive to the first and second signals from said photosensitive means for producing color difference signals with a signal which is in synchronism with said horizontal clock signal;

signal extracting means coupled to said photosensitive means for receiving the first and second signals for producing a luminance signal; and combining means coupled to said signal processing means and said signal extracting means for receiving the color difference signals and the luminance signal for combining the signals for producing a color video signal.

14. A solid state color imaging apparatus for producing a color signal representing a color image of an object, said apparatus comprising:

color filter means constituted by a plurality of pairs of filter strips positioned one above the other in the direction of a vertical scan, one of which filter strips consists of a plurality of first light transmissivity filter elements and second light transmissivity filter elements in alternating sequence in the direction of the horizontal scan, the other of said filter strips consists of alternate filter elements including at least third light transmissivity filter elements and fourth light transmissivity filter elements in alternating sequence in the direction of the horizontal scan wherein said second light transmissivity filter elements and said fourth light transmissivity filter elements are luminance transmissivity filter elements;

photosensitive means including a plurality of photosensitive elements for converting light impinging thereon into an electric signal, said color filter means being placed on said photosensitive means with each photosensitive element of said photosensitive means covered by at least one of said filter elements;

horizontal clock signal generating means for generating a horizontal clock signal;

signal reading means coupled to said photosensitive means and said horizontal clock signal generating means for operating said photosensitive means for reading out the electric signals from said photosensitive elements with said horizontal clock signal for producing first and second signals alternately in successive horizontal scans, said first signal including portions representative of a first light component and a second light component in alternating sequence and said second signal including portions representative of at least a third light component and a fourth light component in alternating sequence; and signal processing means coupled to said photosensitive means and responsive to the first and second signals from said photosensitive means for producing color difference signals with a signal which is in synchronism with said horizontal clock signal.

15. A solid state color imaging apparatus as claimed in claim 14 wherein said first and third and said second and fourth light transmissivity filter elements are one above the other, respectively, in said filter strips.

16. A solid state color imaging apparatus as claimed in claim 14 wehrein said first and fourth and second and third light transmissivity filter elements are one above the other, respectively, in said filter strips.

17. A solid state color imaging apparatus as claimed in claim 14 wehrein said signal processing means comprises:

signal extracting means coupled to said photosensitive means for receiving the first and second signals therefrom for extracting a luminance signal component and color signal components from the first and second signals with the signal which is in synchronism with the horizontal clock signal; and combining circuit means coupled to said signal extracting means for receiving the luminance signal component and the color signal components and for combining these signals for producing color difference signals.

18. A solid state color imaging apparatus as claimed in claim 14 wherein extracting means comprises:

a first filter coupled to said sampling circuit for receiving the luminance component for producing a luminance signal;

a second filter coupled to said sampling circuit for receiving the color signal components for producing a first color component signal and a second color component signal alternately in the successive horizontal scans; and a subtracting circuit coupled to said first and second filters for receiving the luminance signal and the color component signals for subtracting these signals to produce line sequential color difference signals.

19. A solid state color imaging apparatus as claimed in claim 18 wherein said signal processing means comprises:

a modulating circuit coupled to said subtracting circuit for receiving said line sequential color difference signals for modulating a first carrier signal with one of said color difference signals and modulating a second carrier signal which has the phase thereof shifted by 90° with respect to the first carrier signal with the other of said color difference signals to produce line sequential modulated color difference signals;

a delay circuit coupled to said modulating circuit for receiving the line sequential modulating color difference signals for delaying these signals by one horizontal scan period;

a first adding circuit coupled to said modulating circuit and said delay circuit for adding the delayed modulating color difference signals from said delay circuit and the undelayed color difference signals from said modulating circuit for producing simultaneous modulated color difference signals; and a second adding circuit coupled to said first adding circuit and said first filter for receiving the simultaneous modulated color difference signals and the luminance signal for producing a color video signal.

20. A solid state color imaging apparatus for producing a color video signal representing a color image of an object, said apparatus comprising:

color filter means constituted by a plurality of pairs of first and second filter strips positioned one above the other in the direction of a vertical scan, said first filter strips consisting of at least a plurality of first color transmissivity filter elements and a plurality of luminance transmissivity filter elements in alternating sequence in the direction of the horizontal scan, and said second filter strips consisting of at least a plurality of second color transmissivity filter elements and a plurality of luminance transmissivity filter elements in alternating sequence in the direction of the horizontal scan;

photosensitive means including a plurality of photosensitive elements for converting light impinging thereon into an electric signal, said color filter means being placed on said photosensitive means with each photosensitive element of said photosensitive means covered by at least one of said filter elements;

horizontal clock generating means for generating a horizontal clock signal;

signal reading means coupled to said photosensitive means and said horizontal clock generating means for operating said photosensitive means for alternately reading out in synchronism with said horizontal clock signal the electric signals from said photosensitive elements under said first filter strip for producing a first signal and from said photosensitive elements under said second filter strip for producing a second signal in successive horizontal scans, said first and second signals including portions representative of a first color signal component and a luminance signal component in alternating sequence, and portions representative of a second color signal component and a luminance signal component in alternating sequence, respectively;

first extracting circuit means coupled to said photosensitive means for receiving the first and second signals and extracting a modulated component therefrom which represents the color difference of the image having a modulating frequency which is the repetition frequency of the reading out of said photosensitive elements;

reference signal generating means coupled to said horizontal clock signal generating means for generating a reference signal in synchronism with said horizontal clock signal;

demodulating circuit means coupled to said first extracting circuit means and said reference signal generating means for receiving the modulated component and demodulating the color difference signals in synchronism with said reference signal;

second extracting circuit means coupled to said signal reading means for receiving said first and second signals for producing a luminance signal; and signal combining means coupled to said demodulating circuit means said second extracting circuit means and responsive to said ciolor difference signals and said luminance signal therefrom for combining these signals for producing a color video signal.

21. A solid state color imaging apparatus as claimed in claim 20 wherein the first and second color transmissivity filter elements of said color filter means are red and blue transmissivity filter elements, respectively.

22. A solid state color imaging apparatus as claimed in claim 20 wherein the first and second color transmissivity filter elements of said color filter means are red and green transmissivity filter elements, respectively.

23. A solid state color imaging apparatus as claimed in claim 20 wherein the luminance transmissivity filter elements in the first filter strip are above the second transmissivity filter elements in the second filter strip in the direction of the vertical scan, and said second extracting circuit means comprises:

extracting circuit means coupled to said photosensitive means for receiving the first and second signals for extracting therefrom the luminance signal component;

delay circuit means coupled to said extracting circuit means for delaying the luminance signal component therefrom by one horizontal period; and adding circuit means coupled to said extracting circuit means and said delay circuit means for adding the delayed luminance signal component and the undelayed signal component for producing a luminance signal.

24. A solid state color imaging apparatus as claimed in claim 20 wherein said first extracting circuit means comprises band-pass filter means coupled to said photosensitive means for deriving modulated components from said first and second signals which represent color differences of the image, and said demodulating circuit means comprises synchronous detection circuit means coupled to said band-pass filter means for receiving the modulated components for demodulating line sequential color difference signals with the reference signal.

25. A solid state color imaging apparatus as claimed in claim 20 wherein said signal combining means comprises:

modulating circuit means coupled to said demodulating circuit means for receiving said color difference signals for modulating a first carrier signal with one of said color difference signals and modulating a second carrier signal which has the phase thereof shifted by 90° with respect to the first carrier signal with the other of said color difference signals to produce line sequential modulated color difference signals;

delaying circuit means coupled to said modulating circuit means for receiving the line sequential modulated color difference signals for delaying the signals by one horizontal scan period;

first adding means coupled to said modulating circuit means and said delaying circuit means for adding the delayed color difference signals from said delaying circuit means and undelayed color difference signals from said modulating circuit means for producing simultaneous modulated color difference signals; and second adding means coupled to said first circuit means and said second extracting circuit means for adding the simultaneous modulated color difference signals and the luminance signal for producing a color video signal.

26. A solid state color imaging apparatus as claimed in claim 20 wherein said demodulating circuit means comprises:

delay circuit means coupled to said first extracting means for delaying the modulated component by one horizontal scan period;

a first output terminal and a second output terminal;

switching circuit means coupled to said bandpass filter means and said delay circuit means and to said terminals for receiving the undelayed modulated component and the delayed modulated component and transferring a first modulated component representing a first color difference to the first output terminal and a second modulated component representing a second color difference to the second output terminal;

first synchronous detection circuit means coupled to said first output terminal of said switching circuit means for receiving the first modulated component for demodulating a first color difference signal with the reference signal which is in synchronism with said horizontal clock pulse, the repetition frequency of which is one half that of said clock signal; and second synchronous detection circuit means coupled to said second output terminal of said switching circuit means for receiving the second modulated component for demodulating a second color difference signal with the reference signal.

* * * * *